June 5, 1956  G. SPERLING  2,749,536
ELECTRICALLY OPERATED LEAK DETECTOR
Filed Sept. 16, 1953  2 Sheets-Sheet 2

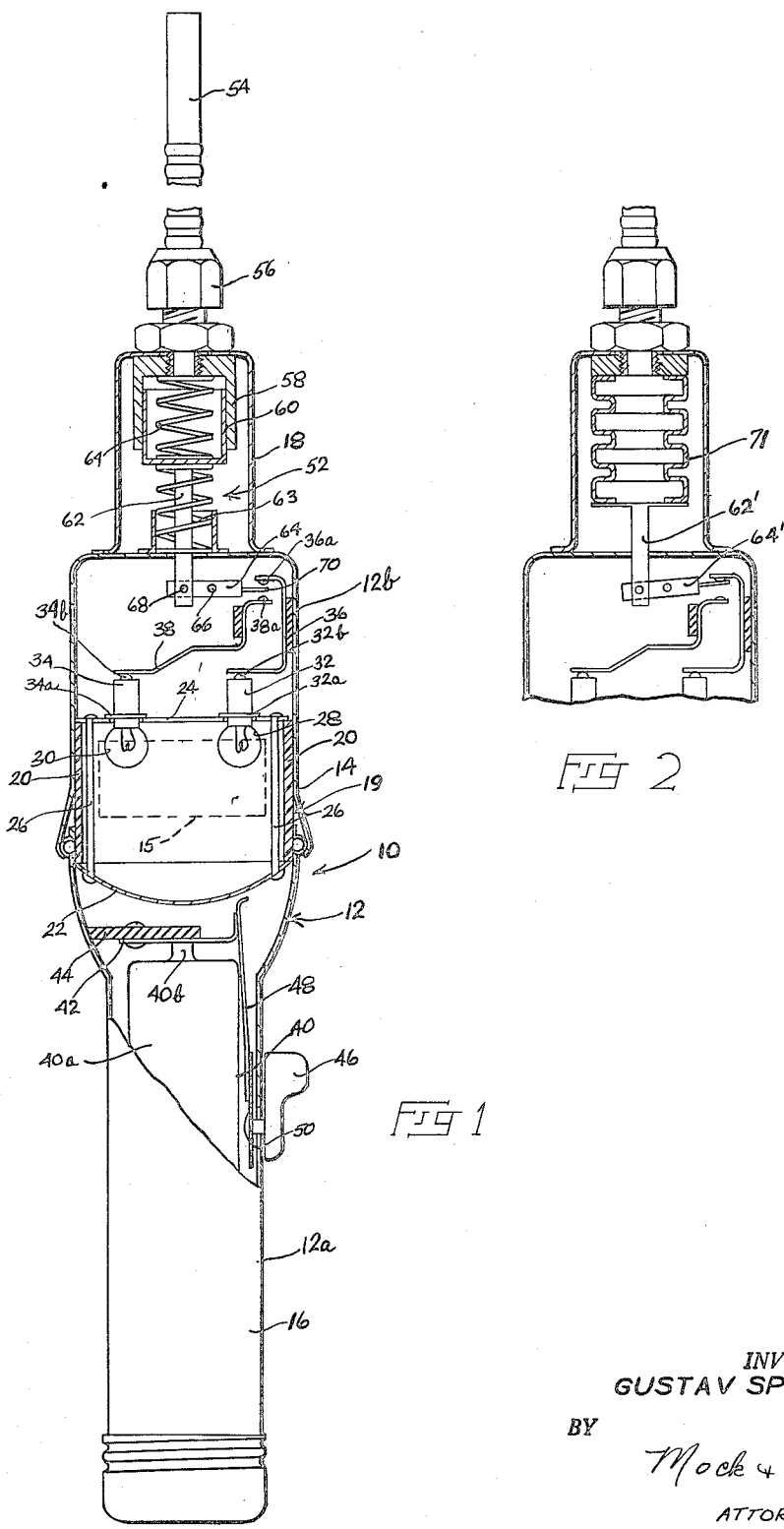

INVENTOR.
GUSTAV SPERLING
BY Mock & Blum
ATTORNEYS

United States Patent Office 2,749,536
Patented June 5, 1956

2,749,536

ELECTRICALLY OPERATED LEAK DETECTOR

Gustav Sperling, Los Angeles, Calif.

Application September 16, 1953, Serial No. 380,394

8 Claims. (Cl. 340—242)

The present invention relates to signalling devices, and in particular to a detector for sensing leaks in both pressure and vacuum systems and immediately presenting a visible signal appropriate to the detected leak. Among the contemplated applications of the detector is the determination of minute leaks of colorless, odorless, and tasteless gases, such as the refrigerant in a household refrigerator unit.

A well known procedure employed in detecting leaks in refrigeration systems of the type containing halides and halide derivatives, is the so-called flame test which relies upon partial decomposition of the halide followed by formation of products changing the color of a sensing flame. There are a number of disadvantages in this testing method, including the inherent difficulty in detecting color changes, especially when attempting to detect a small leak; the time lag until the presence of the gas is manifested by the color change, requiring slow and tedious inspection; the limited field of application to systems under pressure and using halides; and the need for skilled observers capable of distinguishing rather critical color changes.

Although other devices, such as the relatively expensive and bulky electronic leak detector overcome some of the mentioned difficulties, there is a general need for a practical service tool which yields a positive indication of a leak in a pressure or vacuum system independent of the gaseous medium contained within the system, and of sufficient sensitivity to detect minute leaks, of prime importance for household refrigeration servicing. Preferably these several requirements should be met by a structure compatible with general objectives such as ease of manipulation, low cost during use, accessibility from the viewpoint of inspection and replacement of parts, and the like.

Accordingly, it is an object of the present invention to provide a novel detector for sensing leaks in a pressure or vacuum system containing a gaseous medium, such as a refrigerant, which embodies one or more of the aforesaid advantages.

It is another object of the present invention to provide a single detector effective to sense leaks in both pressure and vacuum systems and yielding discrete signals correlated to the type of system, of special utility when testing low temperature refrigeration equipment operating under a partial vacuum.

Certain objects, features and advantages of the present invention are realized by the provision of a leak detector including first and second signalling means each having a normally open energizing circuit and respectively arranged to indicate the presence of leaks in systems under pressure and vacuum. The single sensing means, normally in an equilibrium position, is movable in dependence upon the detection of a leak and operates a circuit-completing element common to the energizing circuits for the first and second signal means which energizes the appropriate one of the signalling means to give a visual indication correlated to the type of leak.

The above objects and further features and advantages of the present invention will be best appreciated upon reference to the following detailed description of several illustrative embodiments, when taken in conjunction with the accompanying drawings, wherein:

Fig. 1 is an elevational view, with parts broken away and sectioned, showing one form of leak detector embodying features of the present invention;

Fig. 2 is a sectional view, with parts broken away, showing a modification to the general structure illustrated in Fig. 1;

Figure 4:
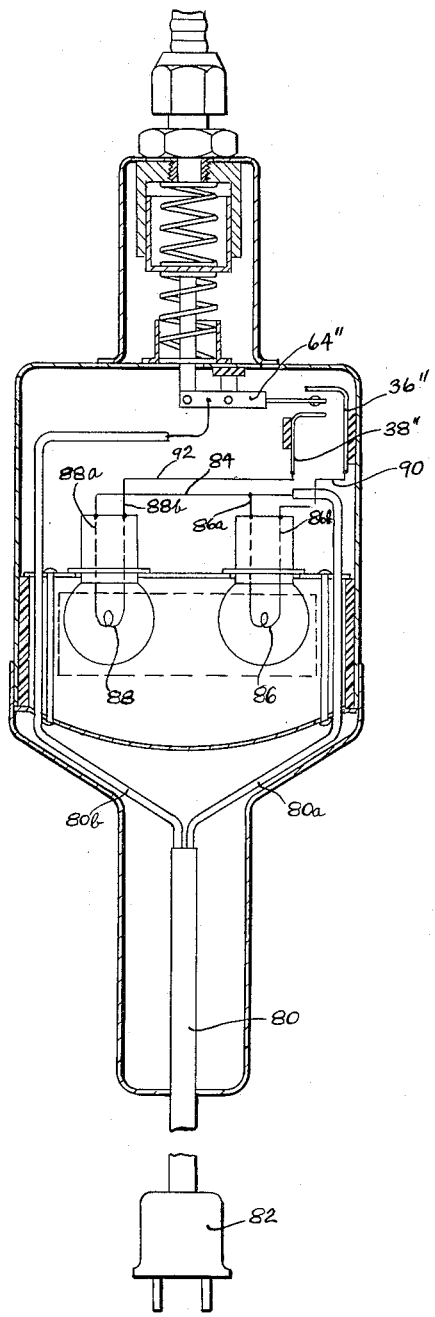
Fig. 4 is an elevational view of a still further embodiment of the invention.

Referring now specifically to Fig. 1, there is shown a pressure and vacuum indicating leak detector 10 which includes a bipartite housing 12 having sections 12a, 12b detachably interconnected at an appropriate releasable lock or joint, the housing sections cooperating to provide an intermediate enlarged section 14 and oppositely directed end sections 16, 18. The intermediate housing section 14 is provided with a window 15, illustrated by the broken lines. Mounted within the intermediate housing section 14 contiguous to the window 15 is a lamp housing or casing 19, which includes a cylindrical insert 20 of insulating material, such as a length of Lucite pipe, which is conformably received within the intermediate housing section; a pair of opposed reflectors 22, 24 traversing the opposite open ends of the cylindrical insert or pipe 20; and spacer and connecting rods 26 interconnecting the reflectors 22, 24 and providing a common electrical connection therebetween.

Supported within the lamp housing or casing 19 are first and second signal lamps 28, 30 arranged to provide respective indications visible through the window 15. Specifically, the lamps 28, 30 are receivable within sockets 32, 34 of a well known construction and having their outer terminals 32a, 34a connected to the conductive reflector 24. The lamps or bulbs 28, 30 are of different colors, one being selected to indicate the presence of a vacuum leak (i. e. the bulb 30), and the other being selected to indicate the presence of a pressure leak (i. e. the bulb 28). Circuit connections 36, 38 appropriately insulated from the housing 12 are respectively in contact with the center terminals 32b, 34b of the lamp socket 32, 34, the circuit connections ending in opposed terminals 36a, 38a, through which energization circuits for the lamps may be selectively completed as will be described.

Disposed within the housing section 16, is an appropriate source of energization for the signal lamps, illustrated as batteries 40 having their respective outer terminals 40a in contact with the casing proper, the inner terminals 40b being connected to a contact bar 42 separated from the casing 12 by a spacer and insulator 44. Slidably disposed on the housing 12 is a manually manipulated finger switch 46 of well-known construction which carries a slide contact 48 set off from the housing by an appropriate spacer and insulator 50. In the position illustrated in Fig. 1, the circuit is not in condition for energization; however, upon pushing the switch 46 upwardly and toward the intermediate housing section 14, the slide contact 48, which is in continuous engagement with the contact bar 42 can be brought into electrical contact with the reflector 22 of the lamp housing 19 to complete an electrical circuit between one terminal set 40b of the batteries 40 and one terminal set 32a, 34a of the lamp sockets 32, 34. As will be appreciated by those skilled in the art, the normally-open energizing circuits for the lamps 28, 30 may be completed by connecting either of the circuit connections or terminal members 36, 38 to the lamp housing 12 which provides a circuit connection between the other terminal sets 40a, 40b of the batteries and the other terminal sets 32b, 34b of the lamp circuits.

The energization circuit for the appropriate one of the lamps 32, 34 is completed by a sensing mechanism 52 disposed within the housing section 18 and including a flexible probe tube 54 projecting externally of the housing section 18. The probe tube 54 is connected by appropriate fittings 56 to the interior of a cylindrical piston 58 having a piston head 60 slidably supported therein for longitudinal displacement in response to the sensing of a pressure or vacuum leak. The piston head 60 is mounted by a low-inertia suspension including a counteracting pair of axially aligned springs 63, 64 biasing the piston head 60 into an equilibrium position. Specifically, upon sensing of a vacuum leak through the probe tube 54, the pressure balance will be upset, whereby the piston head 60 will be displaced upwardly until a balanced position is found; conversely, upon sensing of a pressure leak, the piston head 60 will be displaced downwardly to a balanced position.

Fixed to and movable with the low-inertia piston head 60 is a piston rod 62 which carries a rockable lever 64 movable about the pivot 66. The piston rod is pivotally connected to the rockable member 64 at a pivot 68 adjacent to and spaced on one side of the pivot 66, a circuit-completing contact or element 70 being carried on one opposite side of the pivot 66 and disposed for movement between the opposed terminals 36a 38a. The spacing of the pivot 68 with respect to the pivot 66 and the circuit-completing contact 70 with respect to the pivot 66 is selected such that a short lever arm connection is provided between the piston 62 and the pivot of the rockable lever 66 and a long lever arm connection is provided between the circuit-completing element 70 and the pivot 66, whereby relatively small movements of the common sensing rod 62 are converted into relatively larger movements at the circuit-completing element 70. By this arrangement, it can be appreciated that relatively minute variations in pressure or vacuum sensed by the spring-suspended piston head 60 will cause contact between the circuit-completing element 70 and the appropriate terminal to complete the circuit for the proper indicating lamp.

A typical cycle of operation for the detector of Fig. 1 will now be described:

Upon sensing of a relatively small pressure leak, the piston head 60 will move downwardly placing the spring 63 under slight pressure which will rock the lever 64 in the counterclockwise direction to bring the circuit-completing element 70 into contact with the terminal 36a. Assuming that the finger switch 46 is initially displaced upwardly to bring the slidable contact 48 into engagement with the conductive lamp housing 19 which is appropriately insulated from the casing proper, a circuit will be completed for the pressure-indicating lamp 28, the circuit including the center terminals 40b of the batteries 40; the cross contact bar 42; the slidable contact 48, the lamp housing 19 including the reflectors 22, 24 and the spacer and connector rods 26 to the outer terminal 32a of the socket 32; the inner terminal 32b of the lamp 32 via the circuit connection 36, the circuit-completing element 70, the rockable lever 64, and the piston rod 62 connected to the housing 12, which provides a conductive connection to the outer battery terminal 40a. Responsive to detection of a vacuum leak, the lever 64 will be rocked in a clockwise direction to contact the terminal 38a and completing the circuit for the lamp 30.

Reference will now be made to Fig. 2 showing a modified construction similar in all respects to the embodiment illustrated in Fig. 1 except for the replacement of the spring-suspended piston-type sensing mechanism 52 with a bellows 71 carrying the operating rod 62' for selectively rocking the lever 64'. It will be appreciated that the bellows 71 is expanded in response to detection of a pressure leak causing a corresponding counterclockwise movement of the rocking lever 64', and that in response to detection of a vacuum leak, the bellows will contract to rock the lever 64' in the clockwise direction.

Figure 3:
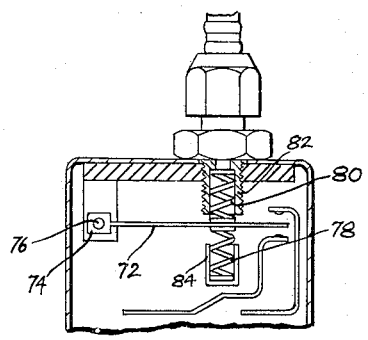
Fig. 3 is a sectional view, with parts broken away, showing a further modification to the structure of Fig. 1.

In Fig. 3 there is shown a further modification of the sensing mechanism 52 which employs a diaphragm 72 carried by a block 74 mounted on a pivot 76 fixed in the upper housing section. The diaphragm, having a balanced spring suspension 78, 80 is displaced through direct communication with the probe tube against one face of the diaphragm. The spring 80 is disposed within a cylindrical coupling sleeve 82, while the spring 78 is received within an upwardly opening guide cup 84, the diaphragm itself serving as or carrying the circuit-completing element for contact with the opposed terminals 36a, 36b.

The construction illustrated in Fig. 4 is similar in all material respects to the embodiment of Fig. 1 except for the use of a line supply for the energization circuit. Specifically, a power cord 80 having two conductors 80a, 80b terminates in a male plug 82 which is to be received in a suitable receptacle, the conductor 80a being connected through a common conductor 84 connected to one side 86a, 88a of the lamps 86, 88, the conductor 80b being connected to the rockable lever 64''. The terminal member 36'' is connected to the other side 86b of the lamp 86 by the lead 90, while the terminal member 38'' is connected by a lead 92 to the other side 88b of the lamp 88. Except for this change in the electrical energization circuit which conditions the indicator for operation upon plugging in of the receptacle 82 to an appropriate female receptacle or the like, the details of the detector illustrated in Fig. 4 are the same as the construction of Fig. 1. Accordingly, further description will be dispensed with in the interests of simplicity and clarity.

From the foregoing, it will be appreciated that the leak detector of the present invention is capable of sensing both pressure and vacuum leaks and is exceptionally simple to manipulate and is in no way limited to a particular type of leak, as are the halide detectors. Further, the detector which is only energized in response to detection of a leak, finds numerous applications not only in the fields of refrigeration but other industrial work, such as detection of leaks in plumbing or the like.

While in accordance with the provisions of the statutes, I have illustrated and described the best form of embodiment of my invention now known to me, it will be apparent to those skilled in the art that numerous changes may be made in the form of the apparatus disclosed without departing from the spirit of my invention as set forth in the appended claims and that in some cases certain features of my invention may be used to advantage without a corresponding use of other features.

I claim:

1. A leak detector comprising first and second electrical signalling means each having a normally open energizing circuit and respectively arranged to indicate the presence of leaks in conduits under pressure and vacuum, sensing means movable in dependence upon the detection of a leak and including a piston mounted for linear movement in opposite directions out of an equilibrium position, a balanced spring suspension maintaining said piston in said equilibrium position, and circuit-completing means common to the energizing circuits for said first and second signal means and movable with said sensing means for selectively closing said energizing circuits.

2. A pressure and vacuum-responsive leak detector comprising first and second signal means each having a normally open energizing circuit, common sensing means for said first and second signal means movable in one direction responsive to detection of a leak in a pressure system and movable in the opposite direction responsive to the detection of a leak in a vacuum system, said sensing means including a cylinder having an inlet, a piston head mounted within said cylinder, and a balanced spring suspension for said piston head maintaining same in an equilibrium position, a circuit-completing element common to the normally open energizing circuits for the respective signal means, and a lever rockable about an axis having an operative connection to said piston head at a relatively short distance from said axis and an operative connection to said circuit-completing element at a relatively long distance from said axis whereby relatively small movements of said common sensing means are converted to larger movements at said circuit-completing element.

3. A pressure and vacuum-indicating leak detector comprising a portable bipartite housing having an intermediate section and oppositely directed end sections, said intermediate section being formed with a window, first and second signal lamps in said intermediate section for providing respective indication visible through said window, a source of energization for said signal lamps accessible through one of said end sections, sensing means in the other of said end sections having a flexible probe tube projecting externally of said other end section and being open at its free end for probing a conduit to be tested, said sensing means including a low-inertia element mounted in an equilibrium position and displaced out of said equilibrium position responsive to leak detection by said probe tube, circuit connections between said source of energization and said first and second signal lamps including spaced apart terminals for selectively energizing said signal lamps, and a circuit-completing element carried by said low-inertia element and movable between and into contact with said terminals.

4. A pressure and vacuum-indicating leak detector comprising a housing formed with a window, first and second signal lamps in said housing for providing respective indication visible through said window, a source of energization for said signal lamps, sensing means having a flexible probe tube projecting externally of said housing, said sensing means including a piston cylinder, a low-inertia element mounted with said cylinder, opposed springs biasing said low-inertia element into an equilibrium position for displacement out of said equilibrium position responsive to detection by said probe tube, circuit connections between said source of energization and said first and second signal lamps including spaced apart terminals for selectively energizing said signal lamps, and a circuit-completing element carried by said low-inertia element and movable between and into contact with said terminals.

5. A leak detector for indicating the presence of leaks in conduits under pressure and vacuum, said detector comprising a portable casing, a pressure-responsive sensing device movably mounted in said casing and having a normal equilibrium position, a hollow, flexible probe tube connected at one of its ends to said casing and operatively communicating with said device, the free end of said probe tube being open for probing the conduit being tested, said sensing device being adapted to move in one direction by reason of leaks in conduits under pressure and in a second direction by reason of leaks in conduits under vacuum, first and second normally inactive signalling devices mounted in said casing, and means including said pressure-responsive device for activating either of said signalling devices depending on the direction of movement of said pressure-responsive device.

6. A leak detector according to claim 5 in which said pressure-responsive sensing device is a bellows expansible responsive to detection of a leak in a pressure conduit and collapsible responsive to the detection of a leak in a vacuum conduit.

7. A leak detector according to claim 6 in which said signalling devices each have a normally open energizing circuit, a circuit-completing element common to the normally open energizing circuits and a lever rockable about an axis having an operative connection to said bellows at a relatively short distance from said axis and an operative correction to said circuit-completing element at a relatively long distance from said axis whereby relatively small movements of said bellows are converted to larger movements of said circuit-completing element.

8. A leak detector according to claim 5 in which said signalling devices each have a normally open energizing circuit, said pressure-responsive sensing device including a diaphragm carrying a circuit-completing element common to the normally open energizing circuits, said diaphragm being rockable about an axis and supporting said circuit-completing element at a location spaced from said axis, whereby movements of said diaphragm are transmitted to said circuit-completing element.

References Cited in the file of this patent

UNITED STATES PATENTS

| | | |
|---|---|---|
| 2,004,769 | Shanklin | June 11, 1935 |
| 2,151,092 | Dunsheath | Mar. 21, 1939 |
| 2,275,866 | Runaldue | Mar. 10, 1942 |
| 2,683,782 | Corssen | July 13, 1954 |